United States Patent [19]
Shiiba et al.

[11] Patent Number: 4,643,630
[45] Date of Patent: Feb. 17, 1987

[54] HEAVY-OBJECT LOADING JIG

[75] Inventors: Yoshio Shiiba, Saitama; Akira Koshigaya, Hidaka; Kouichi Kimura, Sayama, all of Japan

[73] Assignee: Honda Giken Kogyo Kabushiki Kaisha, Tokyo, Japan

[21] Appl. No.: 648,218

[22] Filed: Sep. 7, 1984

[30] Foreign Application Priority Data

Sep. 8, 1983 [JP] Japan ................................ 58-165807

[51] Int. Cl.$^4$ ............................................. B65G 35/00
[52] U.S. Cl. .................................. 414/589; 198/463.3; 198/468.6; 248/419; 414/662
[58] Field of Search ............... 414/590, 589, 662, 672; 248/544, 669, 419; 92/107, 108, 85 A; 198/463.3, 468.6, 468.8, 346.2

[56] References Cited

U.S. PATENT DOCUMENTS

| 762,086 | 6/1904 | Ritter | 92/85 A |
|---|---|---|---|
| 2,794,687 | 6/1957 | Harlan et al. | 414/590 X |
| 3,820,665 | 6/1974 | Fisher | 414/590 |
| 3,829,063 | 8/1974 | Holzworth | 414/590 X |
| 4,111,100 | 9/1978 | Boyer | 92/108 X |
| 4,280,786 | 7/1981 | Dyche | 414/749 |
| 4,369,014 | 1/1983 | Jolivet | 414/589 X |
| 4,452,351 | 6/1984 | Mecker | 414/590 X |
| 4,474,519 | 10/1984 | Khirwadkar | 414/589 X |

Primary Examiner—Robert J. Spar
Assistant Examiner—Donald W. Underwood
Attorney, Agent, or Firm—Armstrong, Nikaido, Marmelstein & Kubovcik

[57] ABSTRACT

A heavy-object loading jig has a slide plate provided on the upper end portion of a lifting drive means and a mounting plate for mounting a heavy object thereon. Between the slide plate and the mounting plate is disposed a rolling member which allows the mounting plate to move in any horizontal direction within a limited range. The lifting drive may include: a circular cylinder vertically extending with the upper end thereof opened; a cylindrical member which is integrally secured to the inner lower end portion of the cylinder and defines an annular cylinder chamber between the same and the inner surface of the cylinder; a ring-shaped piston slidably received in the cylinder chamber; and a cylindrical rod which is formed integral with the piston and is projected beyond the upper end of the cylinder and further has the slide plate secured to the upper end portion thereof. The rod may be provided on the upper end portion thereof with a shock absorber which is able to abut against the upper end of the cylindrical member. Further, a cam structure for guiding the mounting plate to a fixed position when it is lowered may be provided between the cylinder and the mounting plate.

5 Claims, 5 Drawing Figures

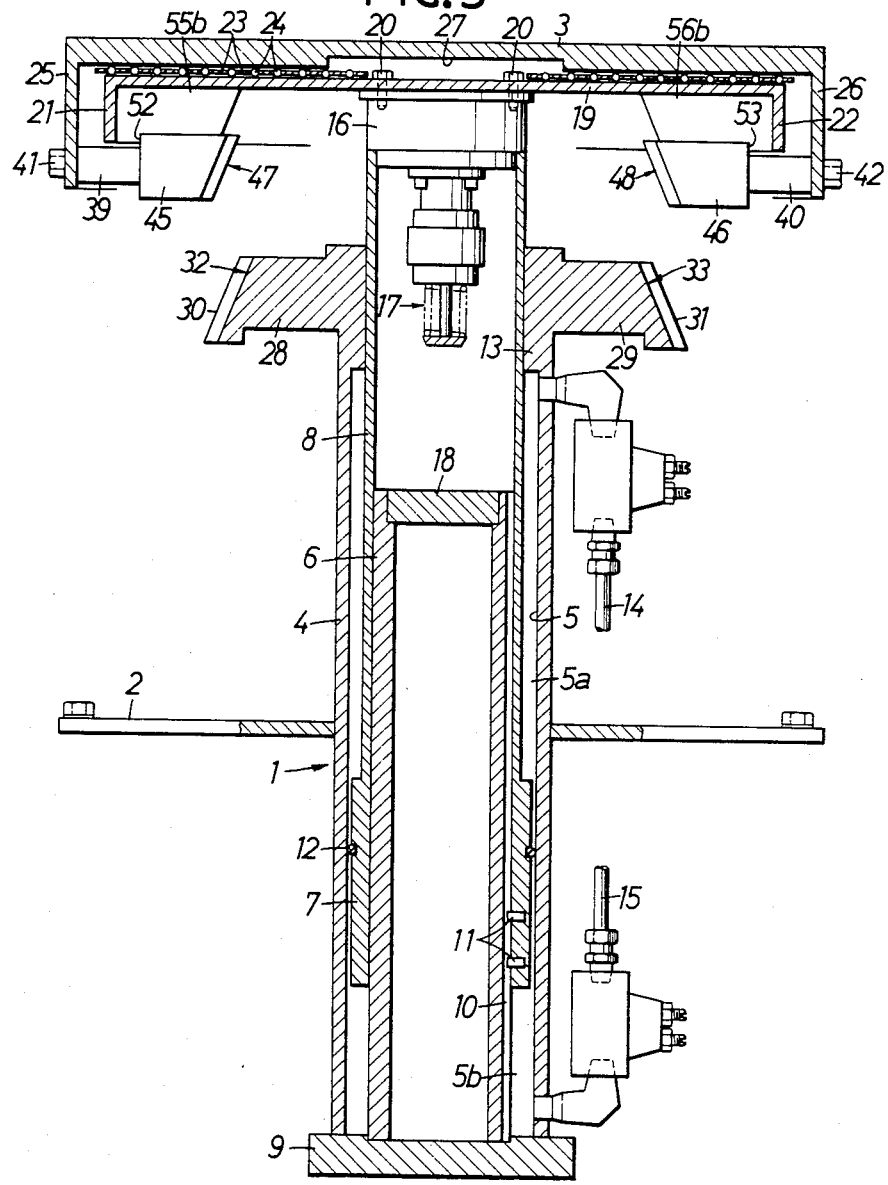

HEAVY-OBJECT LOADING JIG

BACKGROUND OF THE INVENTION

1. Field of the Invention:

The present invention relates to a heavy-object loading jig and, more particularly, to a heavy-object loading jig which is employed, for example, when an engine is mounted on an automotive body suspended from an overhead conveyor.

2. Description of the Prior Art:

A typical conventional heavy-object loading jig of this type is constructed such that the position of a heavy object, for example, an engine, can be moved in both one horizontal direction and another horizontal direction orthogonal to the first horizontal direction in order to adjust the position of the engine in mounting the same on an automotive body. Horizontal movement in such two directions alone, however, involves an inconveniently long time for fine adjustment.

SUMMARY OF THE INVENTION

In view of the above, it is a primary object of the present invention to provide a heavy-object loading jig which is made capable of moving the position of a heavy object mounted thereon in any horizontal direction, thereby to make it possible to reduce the time for fine adjustment.

The above and other objects, features and advantages of the present invention will become clear from the following preferred embodiment thereof, taken in conjunction with the accompanying drawings.

BRIEF DESCRIPTION OF THE DRAWINGS

The accompanying drawings in combination show one embodiment of the present invention, in which:

FIG. 5 is a vertical sectional view of the heavy-object loading jig shown in FIG. 1 in a state where a mounting plate thereof is in a raised position.

DESCRIPTION OF THE PREFERRED EMBODIMENT

One embodiment of the present invention will be described hereinunder with reference to the accompanying drawings.

Figure 1:
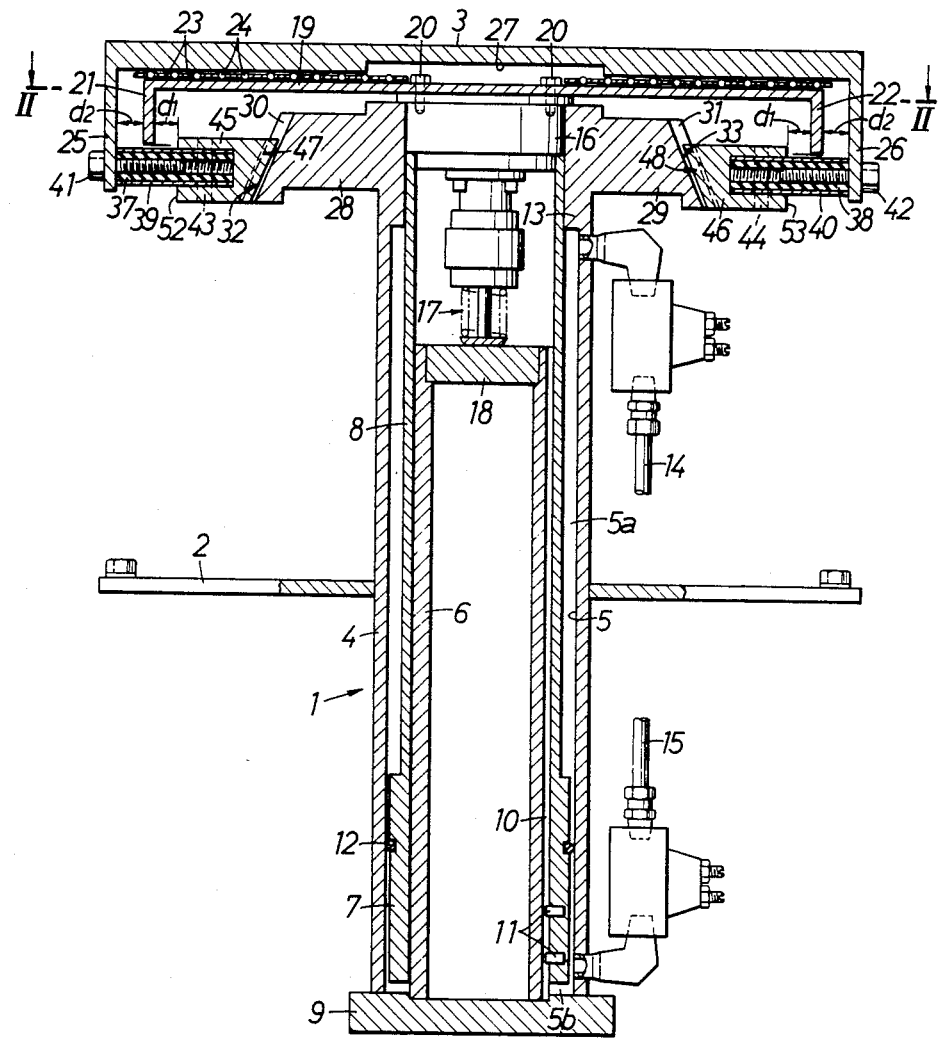
FIG. 1 is a vertical sectional view of the whole of a heavy-object loading jig in accordance with one embodiment of the present invention.

Referring first to FIG. 1, a lifting drive means 1 is fixedly secured to a slat conveyor 2 which is driven in the direction perpendicular to the plane of FIG. 1. An engine (not shown) or a heavy object transported by means of an overhead conveyor (not shown) is transferred to a mounting plate 3 which is raised by the lifting drive means 1. Then, the mounting plate 3 is once lowered by the lifting drive means 1 and is moved to an engine mounting position by the slat conveyor 2. To the engine mounting position, an automotive body is transported by means of an overhead conveyor (not shown). Thus, when the body is positioned above the mounting plate 3, the plate 3 is raised again by the lifting drive means 1. Thereupon, the mounting plate 3 is manually moved in the horizontal direction to effect alignment. After alignment has been properly effected, the engine is mounted at a predetermined position on the body.

The lifting drive means 1 is composed of a circular cylinder 4 which extends vertically with an upper end thereof opened, a cylindrical member 6 which is integrally secured to the inside lower end portion of the cylinder 4 and which defines an annular cylinder chamber 5 between the same and the inner surface of the cylinder 4, a ring-shaped piston 7 which is slidably received in the cylinder chamber 5, and a cylindrical rod 8 which is integrally provided on the piston 7 and is projected beyond the upper end of the cylinder 4.

The cylinder 4 is secured at its approximately central portion in the axial direction thereof to the slat conveyor 2. The lower end of the cylinder 4 is closed by means of an end plate 9. The cylindrical member 6 is secured to the end plate 9 and is disposed inside the cylinder 4 such as to extend halfway therein. Moreover, the cylindrical member 6 has a single key groove 10 cut in its outer surface over the entire length thereof. The piston 7 is, on the other hand, provided with, for example, a pair of rotation-preventing keys 11 which fit in the key groove 10. Accordingly, when the piston 7 is operated, both the piston 7 and the rod 8 are prevented from rotating about their mutual axis. In addition, the piston 7 is fitted on the outer peripheral surface with an O-ring 12 which slidably contacts the inner surface of the cylinder 4 thereby to serve as a seal.

The cylindrical rod 8 is formed so as to be smaller in outside diameter than the piston 7. The cylinder 4 is provided at the upper end thereof with an inner collar portion 13 which projects radially inward so as to slidably contact the outer surface of the rod 8. The inner collar portion 13 closes the upper end of the cylinder chamber 5. The cylinder chamber 5 is partitioned into upper and lower cylinder chambers 5a, 5b by the piston 7. A lowering air supply pipe 14 is connected to the upper portion of the cylinder 4 so as to communicate with the upper cylinder chamber 5a, while a lifting air supply pipe 15 is connected to the lower portion of the cylinder 4 so as to communicate with the lower cylinder chamber 5b.

The upper end of the rod 8 is closed by a closing member 16. A shock absorber means 17 is provided on the lower surface of the closing member 16 inside the cylinder 4. The shock absorber means 17 abuts against an end plate 18 secured to the upper end of the cylindrical member 6 thereby to serve as a shock absorber which lessens any shock produced when the piston 7 and the rod 8 are lowered.

Figure 2:
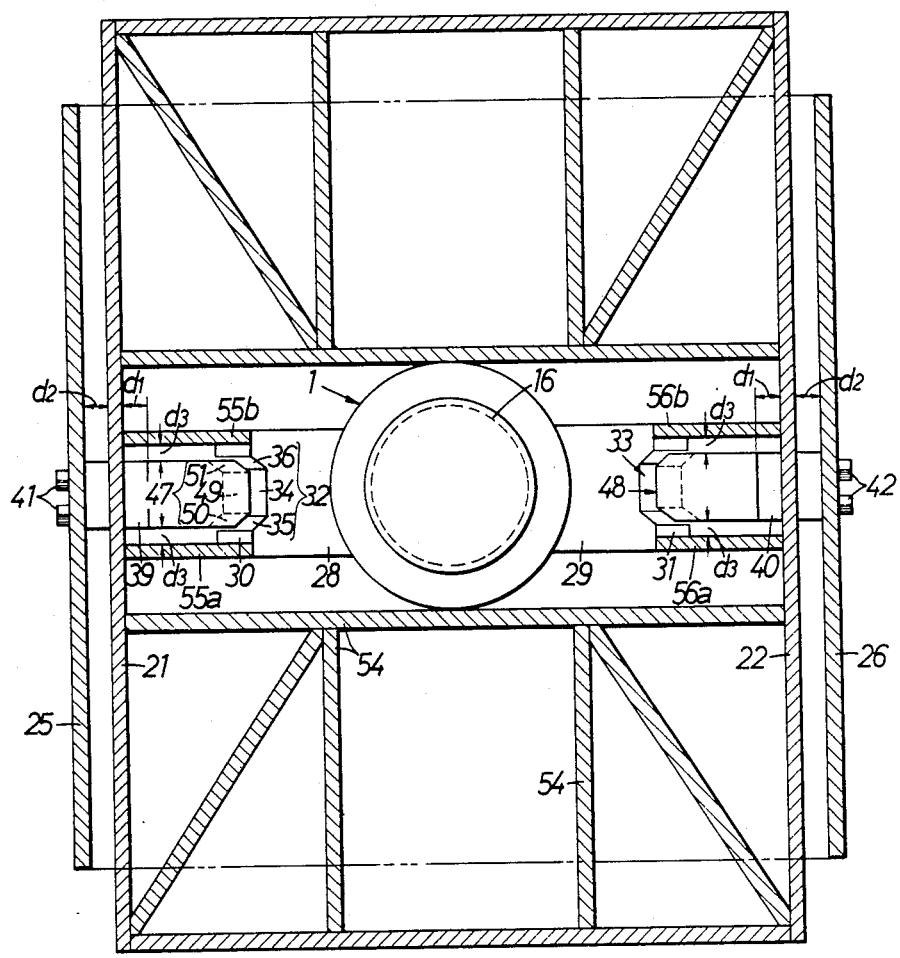
FIG. 2 is a sectional view taken along the line II—II of FIG. 1.
Figure 3:
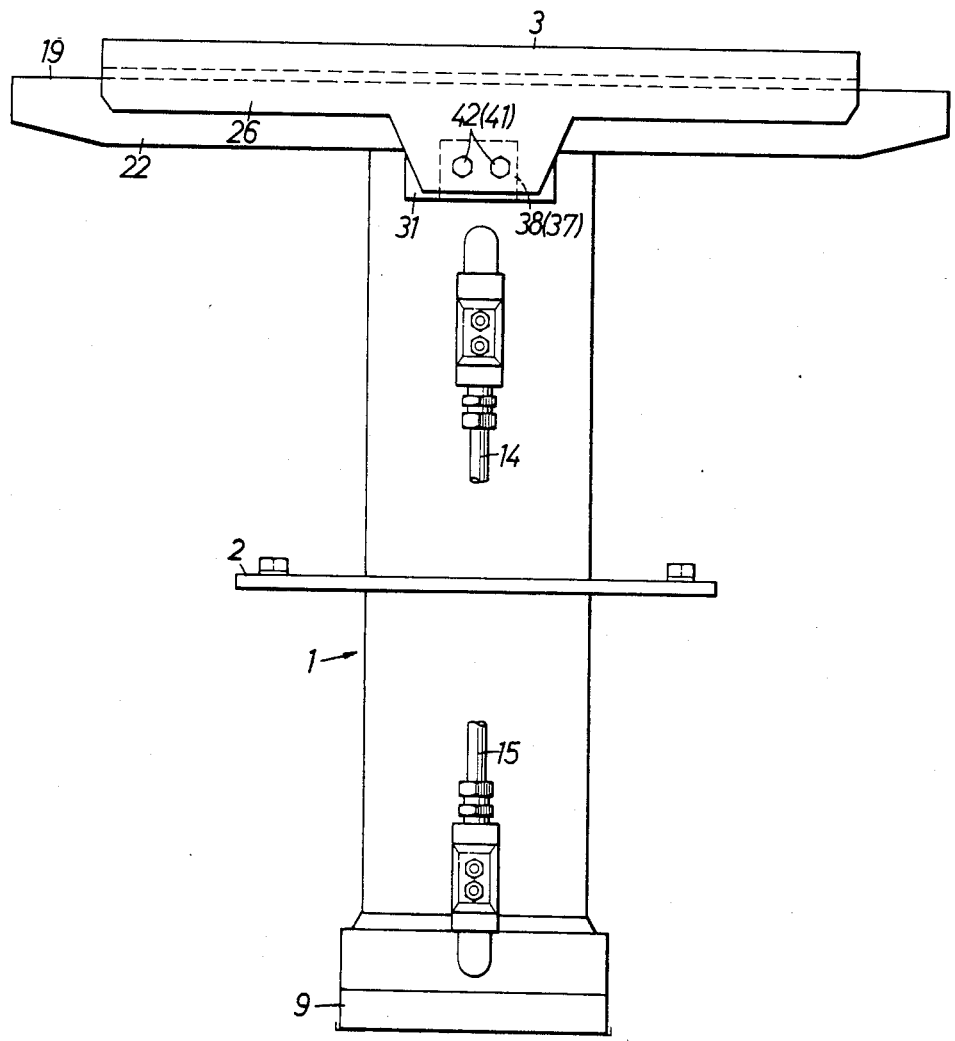
FIG. 3 is a side elevational view of the heavy-object loading jig shown in FIG. 1 as viewed from the right-hand side thereof.

Referring now to FIGS. 2 and 3 along with FIG. 1, a rectangular slide plate 19 is integrally and horizontally fastened to the upper surface of the closing member 16 by means of bolts 20. The slide plate 19 is disposed such that the longitudinal axis thereof is coincident with, for example, the direction which is perpendicular to the plane of FIG. 1 (the vertical direction as viewed in FIG. 2 or in the lateral direction as viewed in FIG. 3). The slide plate 19 is integrally provided at the respective end edges thereof in the widthwise direction (in the lateral direction as viewed in FIG. 1), which is perpendicular to the longitudinal axis thereof, with downwardly extending limiting collars 21, 22.

The slide plate 19 has mounted thereon, except for the central portion thereof, a multiplicity of steel balls 24 as rolling members which are held by retainers 23. On these steel balls 24 is mounted the square-shaped mounting plate 3 for mounting a heavy object such as an engine. The mounting plate 3 is formed such that the length of each side thereof is larger than the width of the slide plate 19. The mounting plate 3 is integrally provided at the respective end edges in the widthwise direction of the slide plate 19 with support collars 25, 26 which extend lower than both the limiting collars 21, 22 of the slide plate 19. In addition, the mounting plate 3 is provided in the central lower surface thereof with a recess 27 for preventing the bolts 20 from abutting against said lower surface when the mounting plate 3 moves horizontally.

Figure 4:
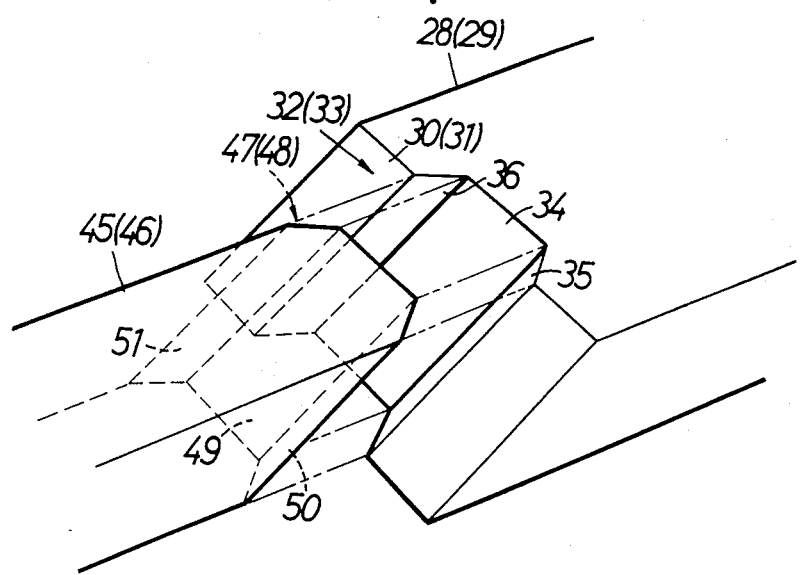
FIG. 4 is an enlarged perspective view of a cam and a cam groove of the heavy-object loading jig shown in FIG. 1.

Referring now to FIG. 4, the cylinder 4 is integrally provided at the upper end thereof with a pair of outer collar portions 28, 29 which outwardly and oppositely project in the widthwise direction of the slide plate 19. The respective outer end surfaces 30, 31 of the outer collar portions 28, 29 are formed so as to taper downwardly at their respective outermost extremities. Between each of the outer collar portions 28, 29 and the mounting plate 3 is provided a cam structure for guiding the mounting plate 3 to a fixed position as it is lowered. More specifically, one of the elements constituting the cam structure, for example, a cam groove 32 (33) is formed in the center of the outer end surface 30 (31). The cam groove 32 (33) is composed of a bottom surface 34 which is parallel to the outer end surface 30 (31) and a pair of side surfaces 35, 36 which are slanted so as to be far away from each other as they extend to their respective outer sides from both side ends of the bottom surface 34.

On the other hand, cam holders 39, 40 which respectively receive therein buffer members 37, 38 of an elastic material, e.g., urethane rubber, are mounted on the respective inner surfaces of both of the support collars 25, 26 of the mounting plate 3 by inserting bolts 41, 42 from the outer sides of the support collars 25, 26. Cam members 45, 46 are respectively mounted on the end portions of the cam holders 39, 40 through pins 43, 44. Moreover, the cam members 45, 46 are provided at the distal ends thereof with cams 47, 48, each employed as the other element constituting the cam structures in respective correspondence with the cam grooves 32, 33. In other words, the cam 47 (48) is composed of an end surface 49 corresponding to the bottom surface 34 of the cam groove 32 (33) and both side surfaces 50, 51 respectively corresponding to both the side surfaces 35, 36 of the cam groove 32 (33) and therefore is able to fit in the cam groove 32 (33).

Under the state where the cams 47, 48 are respectively fitted in the cam grooves 32, 33, that is, the piston 7 and the rod 8 are at their respective lower limit positions, a distance dl is set between the end surface 52 (53) of the cam member 45 (46) on the side thereof which is opposite to the cam 47 (48) and the limiting collar 21 (22) of the slide plate 19. In this case, a distance d2 which is equal to or slightly larger than the distance d1 is set between the limiting collar 21 (22) and the support collar 25 (26) of the mounting plate 3.

Referring back to FIG. 2, a plurality of reinforcing plates 54 are secured to the lower surface of the slide plate 19. Further, to the lower surface of the slide plate 19 are secured two pairs of limiting members 55a, 55b and 56a, 56b which are respectively located in pairs on both sides of each of the cam members 45, 46. When the mounting plate 3 is located at the central position, a distance d3 is set between each of the limiting members 55a, 55b and the cam member 45 and between each of the limiting members 56a, 56b and the cam member 46.

The following is a description of the operation of the above-described embodiment.

First of all, as shown in FIG. 1, with the piston 7 and the rod 8 located at their respective lower limit positions, pressurized air is supplied into the lower cylinder chamber 5b through the lifting air supply pipe 15. Thereupon, the piston 7 is lifted up as shown in FIG. 5 while being prevented from rotating about its axis by the cooperation between the rotation-preventing keys 11 and the key groove 10. Accordingly, the mounting plate 3 also lifts up, so that it is possible to mount on the mounting plate 3 a heavy object, for example, an engine which has been transported by the overhead conveyor. After the engine, for example, has been mounted on the mounting plate 3, air is supplied into the upper cylinder chamber 5a through the lowering air supply pipe 14 thereby to lower the piston 7, together with the mounting plate 3, to their respective initial positions as shown in FIG. 1. Under this state, the slat conveyor 2 is driven to move the mounting plate 3 to the engine mounting position.

At the engine mounting position, when an automotive body to be equipped with the engine is transported above the mounting plate 3, pressurized air is supplied into the lower cylinder chamber 5b through the lifting air supply pipe 15. In consequence, the piston 7 is raised, and the mounting plate 3 having the engine mounted thereon lifts up to a predetermined position for mounting the engine on the body. Then, the operation for mounting the engine on the body is commenced. In the mounting operation, there are cases where it is desired to adjust the position of the engine by finely moving the engine position in horizontal directions. In such cases, the engine position can be adjusted simply by manually moving the mounting plate 3 in any desired horizontal direction. More specifically, since the mounting plate 3 is placed on the slide plate 19 through a multiplicity of steel balls 24, it is possible to move the mounting plate 3 in any desired horizontal direction until the respective end surfaces 52, 53 of the cam members 45, 46 abut against the corresponding limiting collars 21, 22 and until the cam members 45 and 46 abut against their respective limiting members 55a, 55b and 56a, 56b. Accordingly, it becomes possible to effect a fine positional adjustment.

After the engine has been mounted on the body, pressurized air is supplied into the upper cylinder chamber 5a through the lowering air supply pipe 14 thereby to lower the piston 7. In this case, since the cam grooves 32, 33 are provided at the upper end of the cylinder 4 and since the cam members 45, 46 integrally formed with the mounting plate 3 are respectively provided with the cams 47, 48 which correspond to their respective cam grooves 32, 33, even if the central position of the mounting plate 3 is offset from the center of the jig, the mounting plate 3 will move such that the cams 47, 48 will fit in their respective cam grooves 32, 33. Accordingly, when the piston 7 lowers to reach its lower limit position, the central position of the mounting plate 3 has been restored to the central position of the jig. Thus, when a heavy object, such as an engine, is mounted on the mounting plate 3, the mounting plate 3 is constantly kept at the central position of the jig; therefore, when the heavy object is mounted on the mounting plate 3, it is possible to locate the mounting plate 3 at a fixed position at all times.

As has been described above, according to the present invention, between the slide plate provided on the upper end portion of the lifting drive means and the mounting plate for mounting a heavy object thereon are interposed the rolling elements which allow the mounting plate to move in any horizontal direction within a limited range. Therefore, the mounting plate having a heavy object, for example, an engine mounted thereon, can be moved in any horizontal direction, so that it is possible to speedily and easily effect a positioning operation when, for example, an engine is mounted on an automotive body as described above.

What is claimed is:

1. A heavy-object loading jig which is mounted on a conveyor for integral displacement therewith in response to running operation of the conveyor, comprising:
   a lifting drive means;
   a slide plate on the upper end portion of said lifting drive means;
   a mounting plate for mounting a heavy object thereon;
   a rolling member interposed between said slide plate and said mounting plate, said rolling member allowing said mounting plate to be moved on said slide plate by manual force in any horizontal direction within a limited range;
   said lifting drive means having:
   a circular cylinder vertically extending with an upper end thereof opened;
   a cylindrical member which is intergrally secured to an inner lower end portion of said cylinder and defines an annular cylinder chamber between the cylindrical member and an inner surface of said cylinder;
   a ring-shaped piston slidably received in said cylinder chamber; and
   a cylindrical rod which is formed integral with said piston and is projected beyond the upper end of said cylinder and further has said slide plate secured to an upper end portion thereof; and
   a cam structure between said cylinder and said mounting plate for guiding said mounting plate to a fixed position when said mounting plate is lowered.

2. A heavy-object loading jig according to claim 1, wherein said cylindrical rod is provided on the upper end portion thereof with a shock absorber means for abutment against an upper end of said cylindrical member.

3. A heavy-object loading jig according to claim 1 further comprising means provided on said slide plate and said mounting plate, respectively, said means on said slide plate and said mounting plate cooperated with each other through mutual abutment to restrict the horizontal movement of the mounting plate within said limited range.

4. A heavy-object loading jig comprising:
   a slide plate provided on the upper end portion of a lifting drive means;
   a mounting plate for mounting a heavy object thereon; and
   a rolling member interposed between said slide plate and said mounting plate, said rolling member allowing said mounting plate to move in any horizontal direction within a limited range, said lifting drive means comprising a circular cylinder vertically extending with an upper end thereof opened;
   a cylindrical member which is integrally secured to an inner lower end portion of said cylinder and defines an annular cylinder chamber between the cylindrical member and an inner surface of said cylinder;
   a ring-shaped piston slidably received in said cylinder chamber;
   a cylindrical rod which is formed integral with said piston and is projected beyond the upper end of said cylinder and further has said slide plate secured to an upper end portion thereof; and a cam structure between said cylinder and said mounting plate for guiding said mounting plate to a fixed position when said mounting plate is lowered.

5. A heavy-object loading jig according to claim 4 wherein said rod is provided on the upper end portion thereof with a shock absorber means which is able to abut against an upper end of said cylindrical member.

* * * * *